United States Patent [19]
Yamada

[11] 4,211,081
[45] Jul. 8, 1980

[54] EXHAUST BYPASSING SYSTEM FOR A TURBOCHARGER

[75] Inventor: Koichiro Yamada, Ibaraki, Japan

[73] Assignee: Hitachi, Ltd., Japan

[21] Appl. No.: 960,565

[22] Filed: Nov. 14, 1978

[30] Foreign Application Priority Data

Nov. 21, 1977 [JP] Japan ................ 52/140479

[51] Int. Cl.² .......................... F02B 37/00
[52] U.S. Cl. ......................................... 60/602
[58] Field of Search ............... 60/600, 601, 602, 603

[56] References Cited
U.S. PATENT DOCUMENTS

1,310,682  7/1919  Sherbondy ................ 60/602

FOREIGN PATENT DOCUMENTS

2657794  6/1978  Fed. Rep. of Germany ........... 60/602

*Primary Examiner*—Michael Koczo
*Attorney, Agent, or Firm*—Craig & Antonelli

[57] ABSTRACT

In an exhaust bypassing system for a turbocharger for use with an internal combustion engine such as automobile engine, an opening is provided in the wall of an exhaust passage so as to introduce the exhaust pressure of the engine into the interior of a diaphragm of a valve assembly which adjusts the quantity of exhaust gas to be bypassed and in which a rod having a valve body at its fore end is attached to the diaphragm.

7 Claims, 2 Drawing Figures

EXHAUST BYPASSING SYSTEM FOR A TURBOCHARGER

BACKGROUND OF THE INVENTION

This invention relates to an exhaust bypassing system for a turbocharger. More particularly, it relates to an exhaust bypassing system for a turbocharger suitable for use with an internal combustion engine such as an automobile engine.

An exhaust bypassing turbocharger wherein part of the exhaust gas of an automobile engine is bypassed without passing it through a turbine to regulate the output of the turbine and to control the quantity of air which is compressively fed to the engine by a compressor interlocking with the turbine, has been known from U.S. Pat. No. 3,035,408.

The exhaust bypassing system of the turbocharger of this type is provided with a control valve for regulating the quantity of the exhaust to be bypassed. The control valve has a valve body which opens and closes an exhaust bypass passage, and a rod whose one end has the valve body mounted thereon. The rod extends across an exhaust passage, and a diaphragm is mounted on the end of the rod remote from the valve body. The diaphragm separates a suction pressure chamber which communicates with the outlet portion of the compressor through a suction pressure pipe and an atmospheric pressure chamber which is open into the atmospheric air. A compression spring which holds the diaphragm in pressed contact is disposed in the atmospheric pressure chamber in a manner to surround the outer periphery of the rod. The rod which is attached to the diaphragm is moved by the outlet pressure of the compressor or the exhaust pressure of the engine, to open or close the exhaust bypass passage. A rod guide portion which supports the rod by permitting it to penetrate therethrough is provided in the wall of the engine exhaust passage.

In the exhaust bypassing system of the turbocharger as described above, the control valve is influenced by the exhaust pressure of the engine, and hence, the quantity of the bypass exhaust is not always held in a state proportional to the outlet pressure of the compressor, so that the inlet pressure of the turbine is unreliable. Accordingly, the quantity of the feed air to the engine does not agree with the quantity which the engine requires, and the optimum air fuel ratio is not attained.

In the prior-art exhaust bypassing system for the turbocharger, carbon and corrosive particles which are contained in the exhaust adhere to the rod guide portion, and the operation of the control valve becomes unsmooth. In extreme cases, the carbon etc. stick fast to the guide portion, and the control valve becomes unadjustable.

SUMMARY OF THE INVENTION

An object of this invention is to provide an exhaust bypassing system for a turbocharger in which the quantity of air to be supplied to an engine is controlled with the degree of opening of a control valve proportioned to only the suction pressure of a compressor outlet, whereby the optimum air fuel ratio is obtained.

Another object of this invention is to provide an exhaust bypassing system for a turbocharger which is equipped with a control valve being free from the adherence or fast sticking of carbon etc. in a rod guide portion and operating smoothly.

A feature of this invention consists in an exhaust bypassing system for a turbocharger wherein a valve assembly for opening and closing an exhaust bypass passage is formed with an exhaust pressure chamber into which an exhaust pressure of an engine is introduced, in such a manner that the exhaust pressure chamber is partitioned by a diaphragm to which a rod having a valve body at its fore end is attached and that it is located on a side opposite to a pressure chamber into which an outlet pressure of a compressor is introduced.

DESCRIPTION OF THE DRAWING

FIG. 1 is a schematic explanatory view of an exhaust bypassing system for a turbocharger for use with an automobile engine, showing an embodiment of this invention, while

DESCRIPTION OF THE PREFERRED EMBODIMENTS

Figure 1:
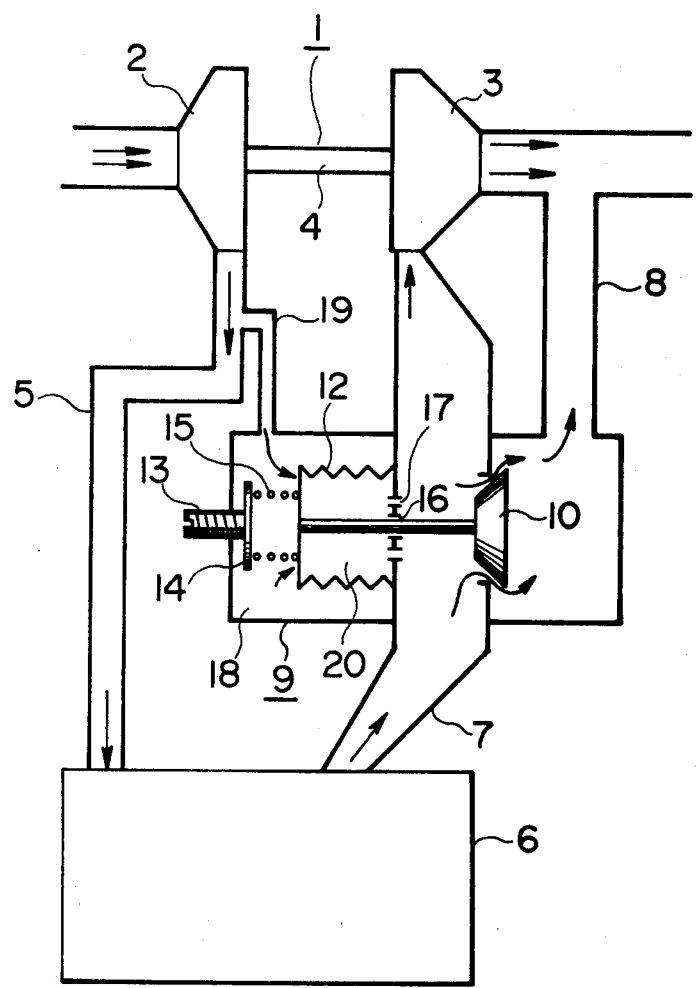

FIG. 1 shows an embodiment of this invention, and is a schematic explanatory view of an exhaust bypassing system for a turbocharger for use with an automobile engine. A turbocharger 1 is constructed of a compressor 2, a turbine 3, and a shaft 4 for coupling the compressor 2 and the turbine 3. An outlet portion of the compressor 2 is held in communication with a suction portion of an engine 6 by a suction pipe 5. Further, an exhaust portion of the engine 6 is held in communication with an inlet portion of the turbine 3 by an exhaust pipe 7.

A bypass passage 8 is formed between the exhaust pipe 7 and an outlet portion of the turbine 3. The bypass passage 8 is opened or closed by a valve body 10 of a control valve 9. The valve body 10 is mounted on the fore end of a rod 11, while the other end of the rod 11 is fixed to an end plate of a diaphragm (bellows) 12 made of stainless steel. A compression spring 15 is arranged between the end plate of the diaphragm 12 and an end plate 14 of a movable adjusting screw 13. At that wall part of the exhaust pipe 7 on which the diaphragm 12 is mounted, there are provided a rod guide portion 16 for sliding the rod 11 and a vent hole 17.

The outlet pressure of the compressor 2 is introduced through a suction pipe 19 into a suction pressure chamber 18 of the control valve 9 as is formed in a manner to airtightly surround the diaphragm 12. On the other hand, inside the diaphragm 12, an exhaust pressure chamber 20 is formed into which the exhaust pressure of the exhaust pipe 7 is introduced through the vent hole 17.

The rod 11 fixed to the end plate of the diaphragm 12 penetrates through the exhaust pressure chamber 20 as well as the guide portion 16 and extends across the exhaust pipe 7, and it has the valve body 10 mounted on the fore end thereof.

In explaining the operation of the control valve 9 thus constructed, symbols are defined as follows:

$A_1$: effective pressure receiving area of the end plate of the diaphragm 12, $A_2$: effective pressure receiving area of the opening of the bypass passage 8 in the exhaust pipe 7, $P_0$: atmospheric pressure, $P_c$: pressure of the outlet portion of the compressor 2, $P_t$: exhaust pressure of the engine 6 in the exhaust pipe 7, $P_o'$: pressure in the bypass passage 8,
$W_1$: force at which the diaphragm 12 elongates, and
$W_2$: force which the compression spring 15 exerts.

Accordingly, the following equation holds in a state in which the control valve 9 for the bypass quantity of the exhaust is balanced:

$$A_1P_c + A_2P_t + W_2 = A_1P_t + A_2P_o' + W_1 \quad (1)$$

The left-hand side of Eq. (1) indicates a force which acts to open the valve body 10, while the right-hand side indicates a force which acts to close the valve body 10.

In the control valve 9, $A_1$ is made equal to $A_2$, and this is denoted by A. Then, since $A_2P_t = A_1P_t$, $$A P_c + W_2 = A P_o' + W_1$$

In addition, the pressure $P_o'$ inside the bypass passage 8 is substantially equal to the atmospheric pressure $P_o$, so that Eq. (1) can be reduced as follows:

$$P_c - P_o = \frac{W_1 - W_2}{A} \quad (2)$$

Here, the atmospheric pressure $P_o$ and the effective pressure receiving area A of the end plate of the diaphragm 12 are constant, so that $P_c$ and ($W_1 - W_2$) are proportional.

If $P_c$ becomes great, the value of ($W_1 - W_2$) increases. Therefore, the elongating force $W_1$ of the diaphragm 12 ought to become great, and the pushing force $W_2$ of the compression spring 15 ought to become small. In consequence, the end plate of the diaphragm 12 moves rightwards, and the degree of opening of the valve body 10 increases. Accordingly, the quantity of the bypass exhaust increases and simultaneously the pressure of the compressed feed air from the outlet portion of the compressor 2 lowers, so that the valve body is balanced at a proper position.

When the number of revolutions of the engine 6 has risen, the pressure of the outlet portion of the compressor 2 lowers. Therefore, the balance is lost, and the end plate of the diaphragm 12 moves leftwards to decrease the degree of opening of the valve body 10. Accordingly, the output of the turbine 3 increases, the pressure of the outlet portion of the compressor 2 rises, and the quantity of air required by the engine 6 is fed.

The reason why the degree of opening of the valve body 10 is determined in proportion to the suction pressure of the outlet portion of the compressor 2 as above described in that the vent hole 17 is provided in the exhaust pipe 7 so as to introduce the exhaust pressure into the interior of the diaphragm 12, thereby to nullify the exhaust pressure $P_t$ of the engine 6. In this manner, the guide portion 16 through which the rod 11 slides does not clog because the exhaust does not pass therethrough as does in the prior art. The valve body 10 therefore operates smoothly. Moreover, since the diaphragm 12 is made of stainless steel, it is not corroded even when the exhaust pressure is introduced into the interior thereof.

In Eq. (2), the value of ($W_1 - W_2$) varies by adjusting the pushing force $W_2$ of the compression spring 15. It is accordingly possible to change the outlet pressure $P_c$ of the compressor 2 under which the valve body 10 begins to open, and also to increase or decrease the quantity of the bypass exhaust. The adjusting screw 13 is disposed to this end.

Figure 2:
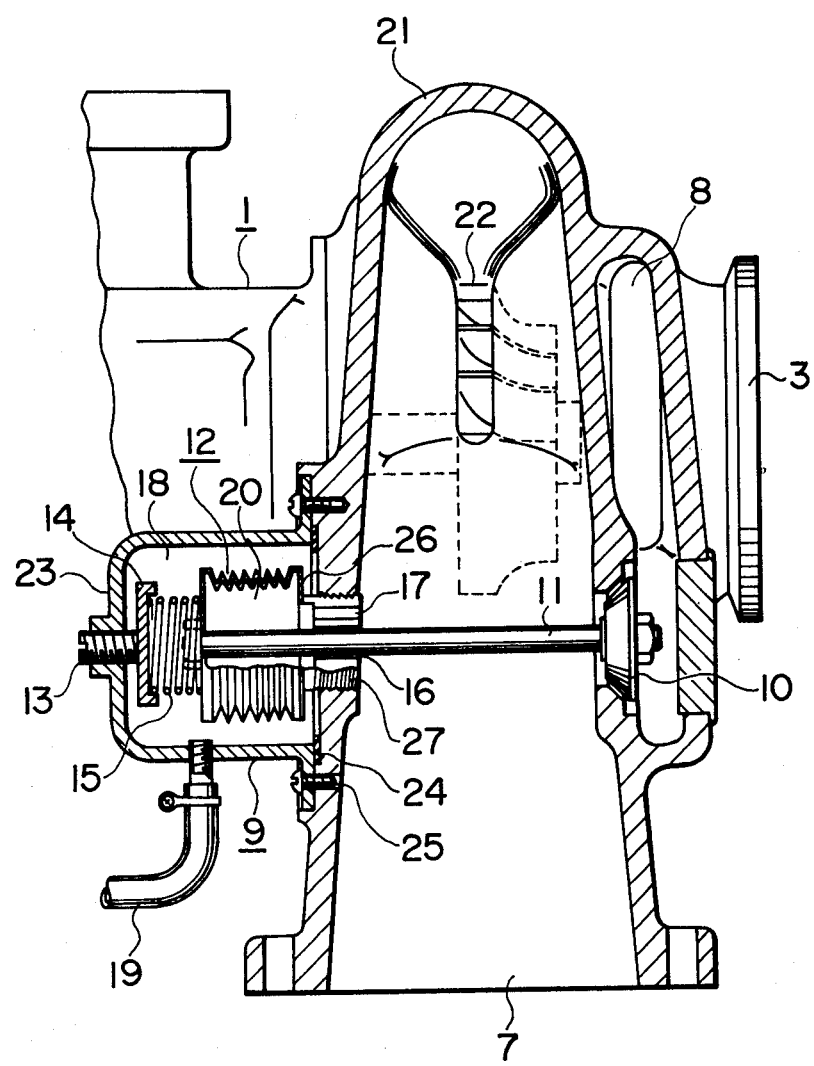
FIG. 2 is a partial sectional view of and around a valve assembly in the exhaust bypassing system.

FIG. 2 is a partial sectional view of and around the control valve of the exhaust bypassing system schematically shown in FIG. 1. The same constituents as in FIG. 1 are assigned the same symbols.

An upper part of the exhaust pipe 7 connected to the exhaust portion of the engine 6 is coupled with a turbine case 21 made of die-tile cast iron. The exhaust of the engine 6 having entered from the inlet of the turbine 3 is introduced into a scroll chamber of the turbine case 21 and rotates a turbine wheel 22. The exhaust having passed through the turbine wheel 22 joins the exhaust from the bypass passage 8, and is emitted into the atmospheric air from the outlet portion of the turbine 3. A rotary shaft of the turbine wheel 22 illustrated by broken lines is coaxial with a vane wheel rotary shaft of the compressor 2 (not shown) on the left-hand side, and it forms the shaft 4 in FIG. 1. The pressure of the suction air compressively fed by the rotation of the compressor vane wheel (not shown) is introduced into the suction pressure chamber 18 of the control valve 9 for the quantity of the bypass exhaust by the suction pipe 19.

The turbocharger 1 is constructed of the compressor 2 which receives the compressor vane wheel therein, the turbine 3 which receives the turbine vane wheel 22 therein, and the turbine rotary shaft identical with the rotary shaft of the compressor vane wheel.

A case 23 which forms the suction pressure chamber 18 of the control valve 9 and which is made of stainless steel is mounted on an exhaust pipe 7 airtightly through a gasket 24 by screws 25. The diaphragm 12 made of stainless steel and the compression spring 15 are accommodated in the case 23. The compression spring 15 is retained between the end plate 14 attached to the adjusting screw 13 threaded in the left end of the case 23 and the end plate of the diaphragm 12.

The diaphragm 12 is constructed of a diaphragm proper or main body 26 which is made of stainless steel and which is in the form of a cylinder having an inside diameter of approximately 25 mm, and a mounting portion 27 which is made of die-tile cast iron. The mounting portion 27 is coupled with the diaphragm proper 26 by the argon gas arc welding. The diaphragm 12 is mounted in such a way that it is airtightly threaded in the wall portion of the turbine case 21 forming the wall portion of the exhaust pipe 7. Two vent holes 17 each having a diameter of about 2 mm and formed by a drill are provided in the mounting portion 27 of the diaphragm 12 in the point symmetry. The exhaust pressure is introduced into the exhaust pressure chamber 20 inside the diaphragm 12 through the vent holes 17.

The rod 11 which is fixed to the end plate of the diaphragm 12 and which is made of heat resisting steel penetrates through the exhaust pressure chamber 20 as well as the guide portion 16 which is provided in the diaphragm mounting portion 27 constituting a part of the suction pipe 7, and it extends across the interior of the exhaust pipe 7. The valve body 10 is mounted on the fore end of the rod 11. This valve body 10 opposes to an opening (round hole having a diameter of about 25 mm) provided in the exhaust pipe 7, and opens or closes the bypass passage 8. The area of the opening provided in the exhaust pipe 7, that is, the opening area of the valve body 10 is made equal to the area of the circular end plate of the main body 26 of the diaphragm 12. In other words, the effective pressure receiving area of the end plate of the diaphragm proper 26 is made equal to the effective pressure receiving area of the bypass passage 8 in the exhaust pipe 7.

In accordance with the exhaust bypassing system for the turbocharger according to the embodiment of this invention as stated above, the exhaust pipe 7 is provided with the vent holes 17 through which the exhaust pressure of the engine 6 is introduced into the interior of the diaphragm 12, and the effective pressure receiving area of the bypass passage 8 for the exhaust pipe 7 and the effective pressure receiving area of the end plate of the diaphragm proper 26 are made equal, so that the control valve 9 is not influenced by the exhaust pressure of the engine 6. In this way, the exhaust pressure of the engine 6 is introduced inside the diaphragm 12 and the outlet pressure of the compressor 2 exhibiting little temperature changes is introduced outside the diaphragm, whereby the quantity of exhaust proportional to the outlet pressure of the compressor 2 is bypassed, in other words, the quantity of air to be supplied to the engine 6 is controlled by the function of only the outlet pressure of the compressor 2, and a suitable air fuel ratio can be attained.

The exhaust pipe 7 is provided with the vent holes 17 through which the exhaust pressure of the engine 6 is deliberately introduced inside the diaphragm 12, so that the exhaust does not pass through the guide portion 16 for supporting and sliding the rod 11 on which the valve body 10 for opening or closing the bypass passage 8 is mounted. Therefore, no pressure difference occurs in the sliding portion of the guide portion 16 for the control valve 9, the sliding portion is prevented from clogging, and the valve operates smoothly. Accordingly, the air fuel ratio of a mixture to be supplied to the engine 6 can be smoothly and suitably controlled over all the running regions of the engine 6 for a long term.

Since the diaphragm 12 is made of stainless steel, it is not corroded even when the exhaust pressure of the engine 6 is introduced thereinto. By adjusting the pushing force of the compression spring 15 with the adjusting screw 13, it is possible to vary the outlet pressure of the compressor 2 under which the control valve 9 begins opening and also to increase or decrease the quantity of exhaust to be bypassed.

While, as described above, the system of the present embodiment for controlling the exhaust bypass quantity of the turbocharger executes the control on the basis of the compressor outlet pressure, it is also possible that the pressure of air to be supplied to the engine is controlled with the exhaust pressure of the engine outlet. For example, there is considered a system wherein the engine exhaust pressure is introduced into the suction pressure pipe in FIG. 2 and wherein the exhaust pressure chamber inside the diaphragm is let open into the atmospheric air. In this case, however, the bypass exhaust quantity fluctuates depending upon the engine exhaust temperature. Therefore, it cannot be said that such a system is more suitable than the foregoing embodiment.

In the foregoing embodiment, the diaphragm made of stainless steel is used. However, similar effects are attained even with a partition member having no chamber open to the atmosphere insofar as it has a structure endurable against the components of the engine exhaust and heat.

The exhaust bypassing system for a turbocharger according to this invention as above described operates smoothly at high precision for a long term, to control the quantity of suction air and to maintain the air fuel ratio in a suitable state, and it is effective in that the enhancement of the engine efficiency and the purification of the exhaust gas can be carried out.

I claim:

1. An exhaust bypassing system for a turbocharger, the turbocharger having a compressor which is driven through a shaft by a turbine, including:
   an engine which is arranged between an outlet of the compressor and an inlet of the turbine,
   an exhaust passage which is disposed between an exhaust port of the engine and the inlet of the turbine,
   an exhaust bypass passage which is disposed between the exhaust passage and an outlet of the turbine, and
   a valve assembly which opens and closes the exhaust bypass passage,
   the valve assembly being composed of a diaphragm which forms a first pressure chamber for introducing a pressure of the compressor outlet thereinto, a rod which is mounted on one end of the diaphragm and which extends across the exhaust passage, and a valve body which is mounted on a fore end of the rod and which opens and closes an opening provided in the exhaust bypass passage,
   characterized in that said valve assembly is formed with a second pressure chamber which is partitioned by said diaphragm and located on a side opposite to said first pressure chamber and into which an exhaust pressure of said engine is introduced.

2. An exhaust bypassing system for a turbocharger as defined in claim 1, wherein an opening for introducing the exhaust pressure therethrough is provided in a wall portion of said exhaust passage.

3. An exhaust bypassing system for a turbocharger as defined in claim 1, wherein an effective pressure receiving area of said exhaust bypass passage in said exhaust passage is made equal to an effective pressure receiving area of an end face of said diaphragm.

4. An exhaust bypassing system for a turbocharger as defined in claim 3, wherein said diaphragm is constructed of a diaphragm proper which is made of stainless steel, and a mounting portion which is coupled with said diaphragm proper and which is made of cast iron.

5. An exhaust bypassing system for a turbocharger as defined in claim 3, wherein an elastic member which urges said diaphragm is arranged inside said first pressure chamber.

6. An exhaust bypassing system for a turbocharger as defined in claim 5, further comprising means capable of adjusting an urging force of said elastic member.

7. An exhaust bypassing system for a turbocharger as defined in claim 6, wherein said elastic member is a compression spring, and the adjusting means is a screw.

* * * * *